(12) United States Patent
Moseley et al.

(10) Patent No.: US 11,262,872 B2
(45) Date of Patent: Mar. 1, 2022

(54) MULTIMODAL IN AIR SENSING OF TOUCH EVENTS

(71) Applicant: Tactual Labs Co., New York, NY (US)

(72) Inventors: Braon Moseley, Round Rock, TX (US); Daniel Ironside, Austin, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 17/034,397

(22) Filed: Sep. 28, 2020

(65) Prior Publication Data

US 2021/0096690 A1 Apr. 1, 2021

Related U.S. Application Data

(60) Provisional application No. 62/907,022, filed on Sep. 27, 2019.

(51) Int. Cl.
*G06F 3/042* (2006.01)

(52) U.S. Cl.
CPC .. *G06F 3/0421* (2013.01); *G06F 2203/04101* (2013.01)

(58) Field of Classification Search
CPC ....... G06F 3/0421; G06F 3/0446; G06F 3/046
USPC ......................................................... 345/156
See application file for complete search history.

(56) References Cited

U.S. PATENT DOCUMENTS

| | | | | |
|---|---|---|---|---|
| 2011/0193818 | A1* | 8/2011 | Chen | G06F 3/046 345/174 |
| 2015/0193039 | A1* | 7/2015 | Hotelling | G06F 3/0446 345/173 |
| 2016/0234365 | A1* | 8/2016 | Alameh | G01S 17/04 |
| 2016/0349792 | A1* | 12/2016 | Alameh | G06F 3/011 |
| 2016/0357268 | A1* | 12/2016 | Alameh | G06F 3/0421 |
| 2017/0185231 | A1* | 6/2017 | Russ | G06F 3/0421 |
| 2017/0255317 | A1* | 9/2017 | Henty | G06F 3/04166 |
| 2018/0335892 | A1* | 11/2018 | Lakshmireddy | G06F 3/04164 |

* cited by examiner

*Primary Examiner* — Albert K Wong
(74) *Attorney, Agent, or Firm* — Adam Landa (57) ABSTRACT

A multi-modal sensor is disclosed that is able to detect and discriminate objects in the near-range range, mid-range and far-range. The sensor uses different sensing modalities that are adapted to cooperate and operate together depending upon the range of the object that is being detected. In an embodiment, infrared transmitters and infrared sensors are used, wherein the infrared transmitters transmit signals in the infrared range that frequency orthogonal with respect to each other.

20 Claims, 6 Drawing Sheets

MULTIMODAL IN AIR SENSING OF TOUCH EVENTS

This application claims the benefit of U.S. Provisional Patent Application No. 62/907,022, filed Sep. 27, 2019, the contents of which are incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The systems relate in general to the field of sensing devices, and in particular to sensing devices that are able to detect objects at various distances from the sensing devices.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

In various embodiments, the present disclosure is directed to sensing systems sensitive to hover, contact and pressure and their applications in real-world, artificial reality, virtual reality and augmented reality settings. It will be understood by one of ordinary skill in the art that the disclosures herein apply generally to all types of sensing systems that are able to detect, for example, hover, contact and pressure.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part is detected by a sensing system. In some sensing systems, detections occur only when the user is in physical contact with a sensor or sensing system, or a device in which it is embodied. In some embodiments, and as generally denoted by the word "contact", these detections occur as a result of physical contact with a sensor, sensing system, or a device in which it is embodied. In other embodiments, and as sometimes generally referred to by the term "hover", the sensor or sensing system may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The present application contemplates various embodiments of sensors designed for implementation in touch control systems. The sensor configurations are suited for use with frequency-orthogonal signaling techniques (see, e.g., U.S. Pat. Nos. 9,019,224 and 9,529,476, and 9,811,214, all of which are hereby incorporated herein by reference). The sensor configurations discussed herein may be used with other signal techniques including scanning or time division techniques, and/or code division techniques. It is pertinent to note that the sensors described and illustrated herein are also suitable for use in connection with signal infusion (also referred to as signal injection) techniques and apparatuses.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; 9,158,411; 10,191,579; 10,386,975; 10,175,772; 10,528,201. Familiarity with the disclosure, concepts and nomenclature within these patents is presumed. The entire disclosure of these patents and applications incorporated therein by reference are incorporated herein by reference. This application also employs principles used in fast multi-touch sensors and other interfaces disclosed in the following: U.S. patent applications; Ser. No. 15/195,675; 15/904,953; 15/905,465; 15/943,221; 16/102,185; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Certain principles of a fast multi-touch (FMT) sensor have been disclosed in the patent applications discussed above. Orthogonal signals are transmitted into a plurality of transmitting conductors (or antennas) and the information received by receivers attached to a plurality of receiving conductors (or antennas), the signal is then analyzed by a signal processor to identify touch events. The transmitting conductors and receiving conductors may be organized in a variety of configurations, including, e.g., a matrix where the crossing points form nodes, and interactions are detected at those nodes by processing of the received signals. In an embodiment where the orthogonal signals are frequency orthogonal, spacing between the orthogonal frequencies, $\Delta f$, is at least the reciprocal of the measurement period T, the measurement period T being equal to the period during which the columns are sampled. Thus, in an embodiment, a column may be measured for one millisecond (i) using frequency spacing ($\Delta f$) of one kilohertz (i.e., $\Delta f = 1/T$).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to biometric activity. In other words, the measure corresponding to signal strength in a given bin would change as a result of some activity.

Figure 1:
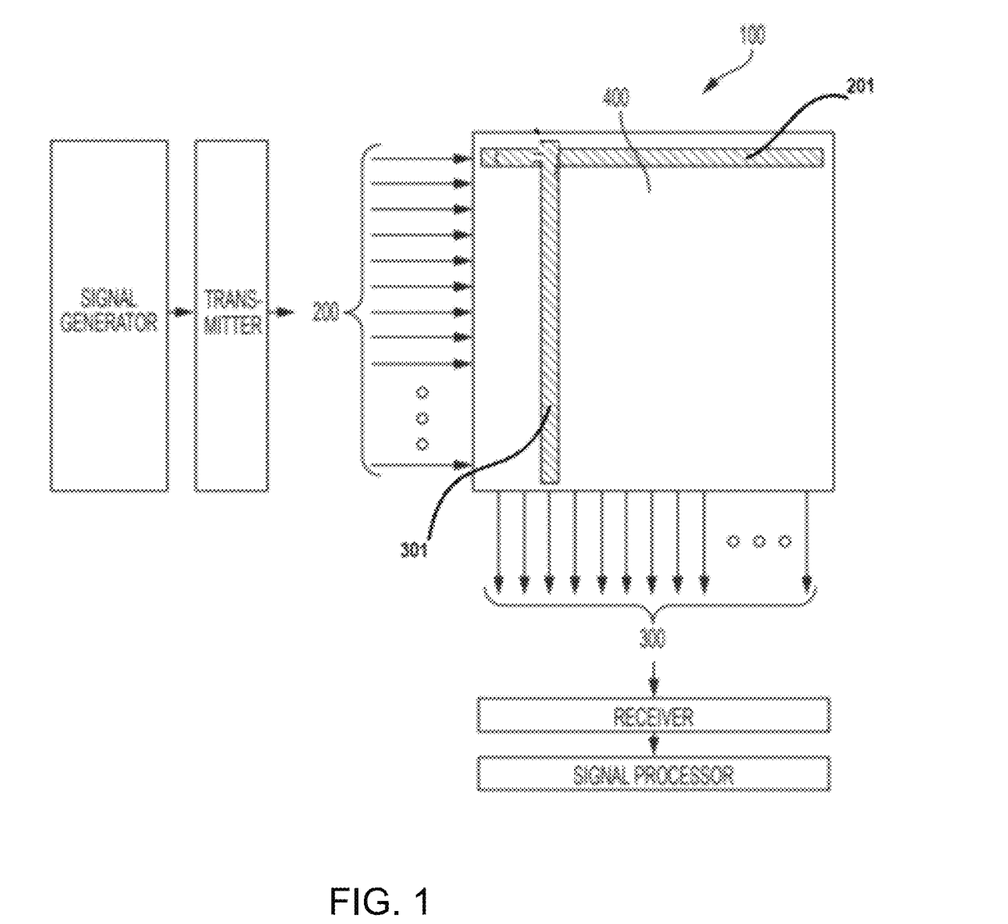
FIG. 1 is a schematic view of a sensing system.

FIG. 1 illustrates certain principles of a fast multi-touch sensing system 100 in accordance with an embodiment. At 200, a different signal is transmitted into each of the row conductors 201 of the touch surface 400. The signals are designed to be "orthogonal", i.e., separable and distinguishable from each other. At 300, a receiver is attached to each column conductor 301. The row conductors 201 and the column conductors 301 are conductors/antennas that are able to transmit and/or receive signals. The receiver is designed to receive any of the transmitted signals, or an arbitrary combination of them, with or without other signals and/or noise, and to individually determine a measure, e.g., a quantity for each of the orthogonal transmitted signals present on that column conductor 301. The touch surface 400 of the sensor comprises a series of row conductors 201 and column conductors 301 (not all shown), along which the orthogonal signals can propagate. In an embodiment, the row conductors 201 and column conductors 301 are arranged such that a touch event will cause a change in coupling between at least one of the row conductors and at least one of the column conductors. In an embodiment, a touch event will cause a change in the amount (e.g., magnitude) of a signal transmitted on a row conductor that is detected in the column conductor. In an embodiment, a touch event will cause a change in the phase of a signal transmitted on a row conductor that is detected on a column conductor. Because the touch sensor ultimately detects touch due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a row conductor 201 and column conductor 301 causes a change in the signal that is transmitted on a row conductor as it is detected on a column conductor. In an embodiment, the change in coupling may be detected by comparing successive measurements on the column conductor. In an embodiment, the change in coupling may be detected by comparing the characteristics of the signal transmitted on the row conductor to a measurement made on the column conductor. In an embodiment, a change in coupling may be measured by both by comparing successive measurements on the column conductor and by comparing known characteristics of the signal transmitted on the row conductor to a measurement made on the column conductor. More generally, touch events cause, and thus correspond to, measurements of the signals on the column conductors 301. Because the signals on the row conductors 201 are orthogonal, multiple row signals can be coupled to a column conductor 301 and distinguished by the receiver. Likewise, the signals on each row conductor 201 can be coupled to multiple column conductors 301. For each column conductor 301 coupled to a given row conductor 201 (and regardless of how touch affects the coupling between the row conductor and column conductor), the signals measured on the column conductor 301 contain information that will indicate which row conductors 201 are being touched simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

In various implementations of a touch device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row-column conductor coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the row conductors and column conductors may vary as a consequence of a physical process, and the change in the orientation (e.g., movement) of the row conductors and/or column conductors with respect to one-another may cause a change in coupling. In an embodiment, the orientation of a row conductor and a column conductor may vary as a consequence of a physical process, and the range of orientation between the row conductor and column conductor includes ohmic contact, thus in some orientations within a range a row conductor and column conductor may be in physical contact, while in other orientations within the range, the row conductor and column conductor are not in physical contact and may have their coupling varied. In an embodiment, when a row conductor and column conductor are not in physical contact their coupling may be varied as a consequence of moving closer together or further apart. In an embodiment, when a row conductor and column conductor are not in physical contact their coupling may be varied as a consequence of grounding. In an embodiment, when a row conductor and column conductor are not in physical contact their coupling may be varied as a consequence of materials translated within the coupled field. In an embodiment, when a row conductor and column conductor are not in physical contact their coupling may be varied as a consequence of a changing shape of the row conductor or column conductor, or an antenna associated with the row conductor or column conductor.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (rows) and a set of conductors onto which signal may be coupled (columns). (The notion that signals are transmitted on row conductors 201 and received on column conductors 301 itself is arbitrary, and signals could as easily be transmitted on conductors arbitrarily designated column conductors and received on conductors arbitrarily named row conductors, or both could arbitrarily be named something else.) Further, it is not necessary that row conductors and column conductors be in a grid. Other shapes are possible as long as a touch event will affect a row-column coupling. For example, the "rows" could be in concentric circles and the "columns" could be spokes radiating out from the center.

And neither the "rows" nor the "columns" need to follow any geometric or spatial pattern, thus, for example, the keys on a keyboard could be arbitrarily connected to form row conductors and column conductors (related or unrelated to their relative positions.) Moreover, an antenna may be used as a row conductor, having a more defined shape than a simple conductor wire such as for example a row made from ITO. For example an antenna may be round or rectangular, or have substantially any shape, or a shape that changes. An antenna used as a row conductor may be oriented in proximity to one or more conductors, or one or more other antennas that act as columns. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types signal propagation channels: instead of row conductors and column conductors, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antennas or conductors may be used rather than just "rows" and "columns." Many alternative embodiments are possible and will be apparent to a person of skill in the art after considering this disclosure. It is likewise not necessary for there to be only one signal transmitted on each transmitting media. In an embodiment, multiple orthogonal signals are transmitted on each row. In an embodiment, multiple orthogonal signals are transmitted on each transmitting conductor or antenna.

Returning briefly to FIG. 1, as noted above, in an embodiment the touch surface 400 comprises a series of row conductors 201 and column conductors 301, along which signals can propagate. As discussed above, the row conductors 201 and column conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

At 300, a receiver is attached to each column conductor 301. The receiver is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the columns providing signal. A frame of signals is received during an integration period or sampling period. In an embodiment, the receiver (or a signal processor associated with the receiver data) may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate e.g., the area of the surface covered by the touch, the pressure of the touch, etc. In an embodiment, a change in coupling over time between the corresponding row conductor 201 and column conductor 301 indicates a change in touch at the intersection of the two.

The row conductor 201 and column conductor 301 setup shown in FIG. 1, as well as the sensing methodologies described above, provide a component of the multimodal sensing systems discussed below, with reference to FIGS. 2-7.

Figure 2:
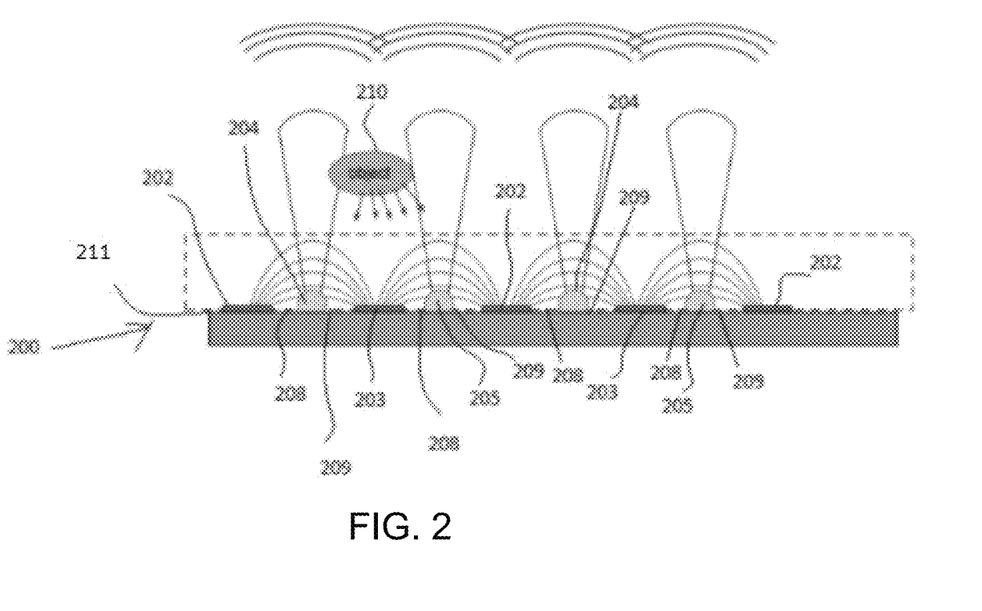
FIG. 2 is a diagram of a multimodal sensing system having multiple ranges for detecting objects with near-range sensing indicated.
Figure 3:
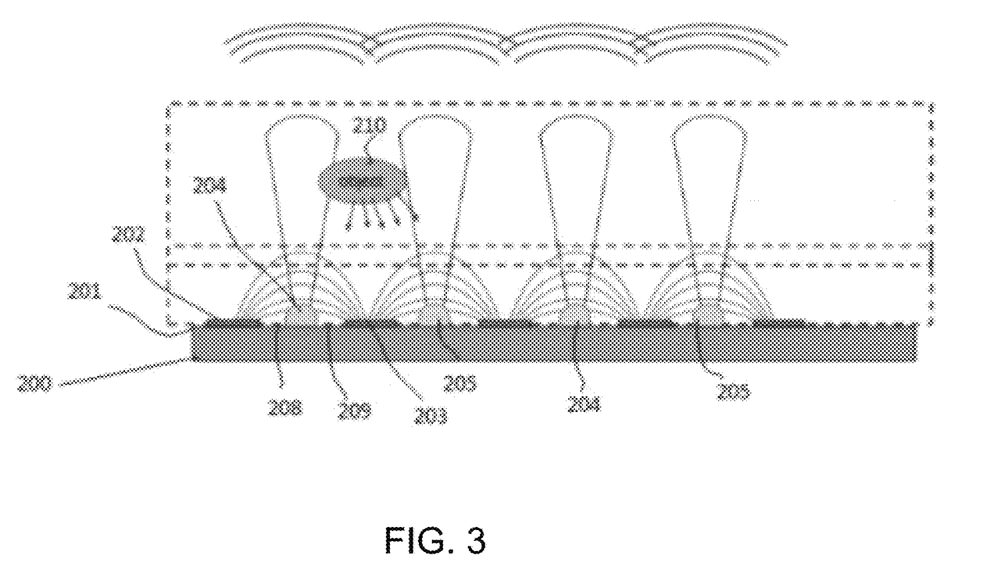
FIG. 3 is a diagram of a multimodal sensing system having multiple ranges for detecting objects with mid-range sensing indicated.
Figure 4:
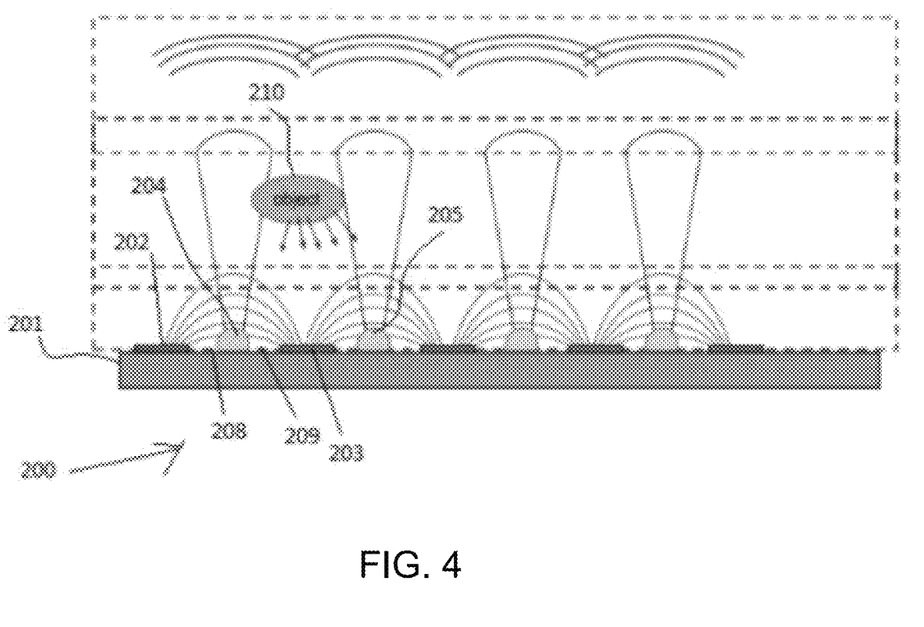
FIG. 4 is another diagram of a multimodal sensing system having multiple ranges for detecting objects with far-range sensing indicated.

Turning to FIGS. 2-4, shown are schematic views of a sensing system arrangement. The sensing system 200 is an arrangement that is adapted to sense objects in the near-range, mid-range and far-range. For purposes of this disclosure, the near-range is a range that extends approximately between 0 to 5 centimeters above the surface 211 of the sensing system 200. While ranges for the sensing modality adapted to determine the presence of objects in the near-range range can sense objects at ranges above 5 centimeters, it should be understood that the capability for the best discrimination of objects above that range may be best determined by other sensing modalities than the sensing modality used for the near-range sensing.

In an embodiment, the near-range sensing is performed by a FMT sensor type sensing modality. In an embodiment a plurality of transmitting conductors 202 and receiving conductors 203 are arranged on a touch surface. Frequency orthogonal signals are transmitted on each of the transmitting conductors 202 and at least some of the transmitted frequency orthogonal signals are received on the plurality of receiving conductors 203. In an embodiment, an array of transmitting conductors 202 transmit frequency orthogonal signals. Receiving conductors 203 are adapted to receive signals that have been transmitted by the transmitting conductors. Measurements of received signals are used in order to determine information regarding objects, fingers, etc. that interact with the transmitted signals.

Other arrangements of transmitting conductors and receiving conductors in accordance with embodiments discussed above and with respect to FIG. 1 can be implemented in the sensing system 200 in order to form the near-range sensing modality.

Turning to FIG. 3, indicated is the mid-range sensing modality. In an embodiment, the mid-range sensing modality may perform with the best resolution at ranges between 2.5 cm to 30 cm. While ranges for the sensing modality adapted to determine the presence of objects in the mid-range can sense objects at ranges above 30 centimeters and below 2.5 cm, it should be understood that the capability for the discrimination of objects above and below that range may be best determined by sensing modalities other than the sensing modality that is used for mid-range sensing.

In some embodiments, the sensing modalities for each of the selected ranges overlap so that there is capability of performing multi-modality error checking. The determination of an object discriminated by the near-range sensing modality can be cross checked with the determination of an object discriminated by the mid-range sensing modality. In an embodiment, unless the object is determined to be present by both the near-range sensing modality and the mid-range sensing modality, the object that is discriminated is determined to be an error. In an embodiment, if the object is discriminated by either the near-range sensing modality or the mid-range sensing modality, the object is determined to be present. In an embodiment, there are certain ranges within the near-range sensing modality and the mid-range sensing modality that are used to determine whether or not an object is present. In an embodiment, there are ranges within each modality that are given greater weight when making a determination regarding the presence of an object. For example, a measurement that would typically be more within the range of the near-range sensing modality that discriminates an object with the near-range sensing modality would give that measurement more deference than a measurement by the mid-range sensing modality that does not discriminate an object.

In an embodiment, the mid-range sensing modality is performed by sensors that transmit signals in the infrared range. In an embodiment, the mid-range sensing modality is performed by sensors that transmit signals in the optical range. In an embodiment, the infrared signals are transmitted so that each of the transmitted infrared signals are frequency orthogonal to each other transmitted infrared signals. In an embodiment, the optical signals are transmitted so that each of the transmitted optical signals are frequency orthogonal to each other transmitted optical signal.

Figure 5:
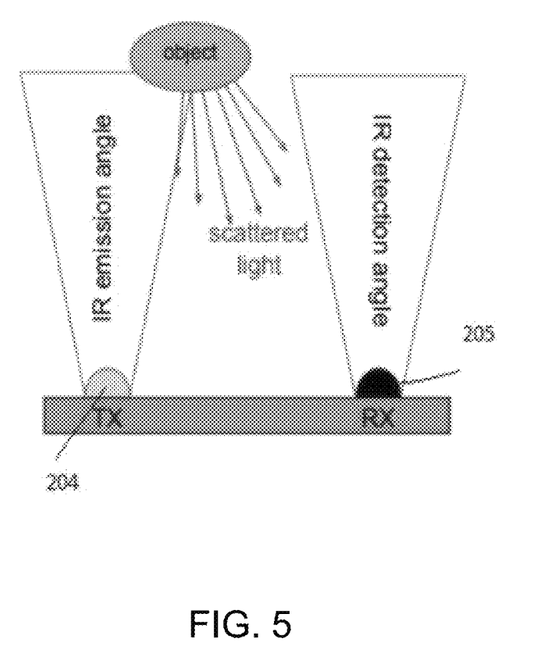
FIG. 5 shows an arrangement of IR transmitters and receivers.
Figure 6:
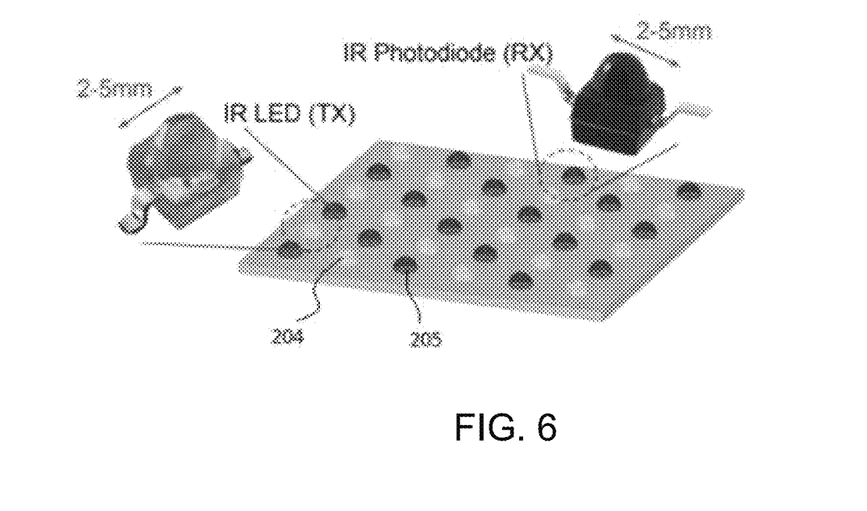
FIG. 6 shows an arrangement of IR transmitters and receivers formed in an array.

With reference to the infrared signal embodiment, by way of example and with reference to FIGS. 5-6, a plurality of infrared signal transmitters 204 and infrared signal receivers 205 are shown. In an embodiment, the infrared signal transmitters 204 are light emitting diodes (LEDs). In an embodiment, the infrared signal receivers 205 are infrared photodiodes. The infrared signal transmitters 204 each transmit frequency orthogonal signals using sinusoidal modulation implementing pulse width modulation. The infrared signal receivers 205 are infrared photodiodes that use demodulation to receive the reflected (or backscattered) transmitted infrared signals that have interacted with the object 210. The signal processor is able to take measurements of the strength and location of the received infrared signals to determine depth and position. The received infrared signal strength is proportional to the position of the object 210.

In the array of infrared signal transmitters 204 and infrared signal receivers 205 shown in FIG. 6 the infrared signal transmitters 204 and infrared signal receivers 205 are arranged in an evenly spaced array wherein an infrared signal transmitter 204 is 2 mm away from an infrared signal receiver 205. In an embodiment, the infrared signal transmitters 204 and infrared signal receivers 205 are arranged in an evenly spaced array wherein an infrared signal transmitter 204 is 3 mm away from an infrared signal receiver 205. In an embodiment, the infrared signal transmitters 204 and infrared signal receivers 205 are arranged in an evenly spaced array wherein an infrared signal transmitter 204 is 4 mm away from an infrared signal receiver 205. In an embodiment, the infrared signal transmitters 204 and infrared signal receivers 205 are arranged in an evenly spaced array wherein an infrared signal transmitter 204 is 5 mm away from an infrared signal receiver 205. In an embodiment, the infrared signal transmitters 204 and infrared signal receivers 205 are arranged in an evenly spaced array wherein an infrared signal transmitter 204 is 4 mm away from an infrared signal receiver 205.

In an embodiment, the infrared signal transmitters and infrared signal receivers are arranged wherein an infrared signal transmitter is located between a pair of infrared signal receivers. In an embodiment, the infrared signal transmitters and infrared signal receivers are arranged wherein a pair of infrared signal transmitters are located between a pair of infrared signal receivers. In an embodiment, the infrared signal transmitters and infrared signal receivers are arranged wherein an infrared signal is located between a pair of infrared signal transmitters. In an embodiment, the infrared signal transmitters and infrared signal receivers are arranged wherein a pair of infrared signal receivers is located between a pair of infrared signal transmitters. In an embodiment, the infrared signal transmitters and infrared signal receivers are arranged wherein the infrared signal transmitters and infrared signal receivers are arranged in a circular pattern. In an embodiment, the infrared signal transmitters and infrared signal receivers are arranged wherein the infrared signal transmitters and infrared signal receivers are arranged in a square pattern. In an embodiment, the infrared signal transmitters and infrared signal receivers are arranged wherein the infrared signal transmitters and infrared signal receivers are arranged in a triangular pattern. In an embodiment, the infrared signal transmitters and infrared signal receivers are arranged wherein the infrared signal transmitters and infrared signal receivers are arranged in a three dimensional pattern, such as a sphere, a cube, a pyramid, etc. In an embodiment, the infrared signal transmitters and infrared signal receivers are arranged wherein the infrared signal transmitters and infrared signal receivers are arranged in a random array.

The arrangement of infrared transmitters and receivers are used to detect the position of an object within the mid-range as shown in FIGS. 2-4. The arrangement and position of the infrared transmitters and receivers can be modified in order to adjust the range at which the infrared transmitters and receivers are effective. For example, the spacing between the infrared transmitters and infrared receivers can impact the resolution of the detected object, the closer the spacing the more resolution that can be achieved during the detection of an object. There can be an increase in object position resolution by reducing the in-air detection area. Larger objects can be discriminated at further distances. Directional emitters can be used in order to control the emitted infrared signal. A switch to a narrow signal can be used in order to discriminate objects at further distances.

Returning to FIG. 4, shown is the far-range sensing modality. The far-range sensing modality may perform with the best resolution at ranges greater than 30 cm. While ranges for the sensing modality adapted to determine the presence of objects in the far-range can sense objects at ranges below 30 centimeters, it should be understood that the capability for the discrimination of objects below that range may be best determined by sensing modalities other than the sensing modality used for the far-range sensing.

In some embodiments, the sensing modalities for each of the selected ranges overlap so that there is capability of performing multi-modality error checking. The determination of an object discriminated by the near-range sensing modality can be cross checked with the determination of an object discriminated by the mid-range sensing and far-range modality. In an embodiment, unless the object is determined to be present by all of the near-range sensing modality, the mid-range sensing modality and the far-range sensing modality the object that is discriminated is determined to be an error. In an embodiment, if the object is discriminated by either the near-range sensing modality, the mid-range sensing modality, or the far-range sensing modality the object is determined to be present. In an embodiment, the various sensing modalities can be correlated with each other with more weight given to a certain modality depending on where the object is detected. For example, if the object is determined to be located at a range of 25 cm the mid-range sensing modality may be given more weight than the far-range sensing modality. In the same scenario the far-range sensing modality may be given more weight than the near-range sensing modality.

In an embodiment, the far-range sensing modality is performed by sensors that transmit signals in the mm wavelength range. In an embodiment, the far-range sensing modality is performed by sensors that transmit signals via the usage of ultrasound. In an embodiment, lasers are used in order to discriminate far-range objects.

The far-range sensing modality may employ different sensing techniques than the other two sensing modalities. Instead of using frequency orthogonal signals, doppler and radar based techniques may be employed. Referring to FIGS. 2-4, the far-range transmitter 208 may transmit and the far-range receiver 209 may receive signals reflected off an object. This can be used in order to discriminate and determine the position of an object.

The several embodiments discussed above illustrate a variety of systems for implementing multi-modal sensors but are not intended to limit the scope of the claims. Other implementations for multi-modal sensors will become apparent to persons of skill in the art in view of this disclosure, and are thus included within the scope of this disclosure.

An aspect of the disclosure is a sensing system. The sensing system comprising: a near-range sensor comprising; a plurality of transmitting conductors, wherein each of the plurality of transmitting conductors is adapted to transmit a signal that is frequency orthogonal to each other signal transmitted; a plurality of receiving conductors, wherein each of the plurality of receiving conductors is adapted to receive signals transmitted from the plurality of transmitting conductors; a mid-range sensor comprising; a plurality of infrared signal transmitters, wherein each of the plurality of infra-red transmitters is adapted to transmit an infrared signal that is frequency orthogonal to each other infrared signal transmitted; and a plurality of infrared signal receivers, wherein each of the plurality of infrared signal receivers is adapted to receive signals transmitted from the plurality of infrared signal transmitters.

Another aspect of the disclosure is a sensing system. The sensing system comprising: a near-range sensor comprising; a plurality of transmitting conductors, wherein each of the plurality of transmitting conductors is adapted to transmit a signal that is frequency orthogonal to each other signal transmitted; a plurality of receiving conductors, wherein each of the plurality of receiving conductors is adapted to receive signals transmitted from the plurality of transmitting conductors; a mid-range sensor comprising; a plurality of mid-range signal transmitters, wherein each of the plurality of mid-range signal transmitters is adapted to transmit a mid-range signal that is frequency orthogonal to each other mid-range signal transmitted; and a plurality of mid-range signal receivers, wherein each of the plurality of mid-range signal receivers is adapted to receive signals transmitted from the plurality of mid-range signal transmitters.

While the invention has been particularly shown and described with reference to a preferred embodiment thereof, it will be understood by those skilled in the art that various changes in form and details may be made therein without departing from the spirit and scope of the invention.

The invention claimed is:

1. A sensing system comprising:
   a near-range sensor comprising;
      a plurality of transmitting conductors, wherein each of the plurality of transmitting conductors is adapted to transmit a signal that is frequency orthogonal to each other signal transmitted;
      a plurality of receiving conductors, wherein each of the plurality of receiving conductors is adapted to receive signals transmitted from the plurality of transmitting conductors;
   a mid-range sensor comprising;
      a plurality of infrared signal transmitters, wherein each of the plurality of infra-red transmitters is adapted to transmit an infrared signal that is frequency orthogonal to each other infrared signal transmitted; and
      a plurality of infrared signal receivers, wherein each of the plurality of infrared signal receivers is adapted to receive signals transmitted from the plurality of infrared signal transmitters.

2. The sensing system of claim 1, wherein the mid-range sensor is adapted to discriminate objects at a further distance from the sensing system than the near-range sensor.

3. The sensing system of claim 1, further comprising;
   a far-range sensor comprising;
      a plurality of far-range signal transmitters, wherein each of the plurality of far-range signal transmitters is adapted to transmit a far-range signal; and
      a plurality of far-range signal receivers, wherein each of the plurality of the far-range signal receivers is adapted to receive signals transmitted from the plurality of far-range signal transmitters.

4. The sensing system of claim 3, wherein the far-range sensor is adapted to discriminate objects at a further distance from the sensing system than the near-range sensor.

5. The sensing system of claim 1, wherein the infrared signal transmitter is light emitting diode.

6. The sensing system of claim 1, wherein each of the infrared signal transmitters are evenly spaced from the infrared signal receivers.

7. The sensing system of claim 1, wherein each of the infrared signal transmitters are not evenly spaced from the infrared signal receivers.

8. The sensing system of claim 1, wherein an object is determined to be present if detected by either the near-range sensor or the mid-range sensor.

9. The sensing system of claim 1, wherein an object is only determined to be present if detected by both the near-range sensor and the mid-range sensor.

10. The sensing system of claim 1, wherein a distance of object from the sensing system is used to weigh whether detection by the near-range sensor or the mid-range sensor is used to determine if an object is present.

11. A sensing system comprising:
    a near-range sensor comprising;
       a plurality of transmitting conductors, wherein each of the plurality of transmitting conductors is adapted to transmit a signal that is frequency orthogonal to each other signal transmitted;
       a plurality of receiving conductors, wherein each of the plurality of receiving conductors is adapted to receive signals transmitted from the plurality of transmitting conductors;
    a mid-range sensor comprising;
       a plurality of mid-range signal transmitters, wherein each of the plurality of mid-range signal transmitters is adapted to transmit a mid-range signal that is frequency orthogonal to each other mid-range signal transmitted; and a plurality of mid-range signal receivers, wherein each of the plurality of mid-range signal receivers is adapted to receive signals transmitted from the plurality of mid-range signal transmitters.

12. The sensing system of claim 11, wherein the mid-range signal transmitter is an infrared signal transmitter.

13. The sensing system of claim 11, wherein the mid-range signal transmitter is an optical signal transmitter.

14. The sensing system of claim 11, further comprising;
a far-range sensor comprising;
a plurality of far-range signal transmitters, wherein each of the plurality of far-range signal transmitters is adapted to transmit a far-range signal; and
a plurality of far-range signal receivers, wherein each of the plurality of the far-range signal receivers is adapted to receive signals transmitted from the plurality of far-range signal transmitters.

15. The sensing system of claim 14, wherein the far-range sensor is adapted to discriminate objects at a further distance from the sensing system than the near-range sensor.

16. The sensing system of claim 14, wherein far-rang signal transmitters transmit mm wavelength signals.

17. The sensing system of claim 11, wherein each of the mid-range signal transmitters are evenly spaced from the mid-range signal receivers.

18. The sensing system of claim 11, wherein each of the mid-range signal transmitters are not evenly spaced from the mid-range signal receivers.

19. The sensing system of claim 11, wherein an object is determined to be present if detected by either the near-range sensor or the mid-range sensor.

20. The sensing system of claim 11, wherein an object is only determined to be present if detected by both the near-range sensor and the mid-range sensor.

* * * * *